US009792081B2

(12) United States Patent
Fukuhara (10) Patent No.: US 9,792,081 B2
(45) Date of Patent: Oct. 17, 2017

(54) DISPLAY DEVICE WITH PLURAL DISPLAYS

(71) Applicant: Mitsubishi Electric Corporation, Tokyo (JP)

(72) Inventor: Hideki Fukuhara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 234 days.

(21) Appl. No.: 14/889,723

(22) PCT Filed: Jul. 5, 2013

(86) PCT No.: PCT/JP2013/068521
§ 371 (c)(1),
(2) Date: Nov. 6, 2015

(87) PCT Pub. No.: WO2015/001664
PCT Pub. Date: Jan. 8, 2015

(65) Prior Publication Data
US 2016/0124699 A1    May 5, 2016

(51) Int. Cl.
*G06F 3/14* (2006.01)
*G06F 3/147* (2006.01)
*G09G 3/36* (2006.01)

(52) U.S. Cl.
CPC .......... *G06F 3/1446* (2013.01); *G06F 3/147* (2013.01); *G06F 3/1423* (2013.01); *G06F 3/1431* (2013.01); *G09G 3/36* (2013.01); *G09G 2300/026* (2013.01); *G09G 2340/0407* (2013.01); *G09G 2370/04* (2013.01); *G09G 2370/042* (2013.01); *G09G 2370/10* (2013.01)

(58) Field of Classification Search
CPC .......... G06F 3/1423–3/1446; G09G 2300/026
See application file for complete search history.

(56) References Cited

U.S. PATENT DOCUMENTS

| | | | | |
|---|---|---|---|---|
| 6,476,789 B1* | 11/2002 | Sakaguchi | ........... | G09G 3/3677 345/100 |
| 6,970,145 B1* | 11/2005 | Aoki | ............ | G06F 3/1431 345/1.2 |
| 7,053,862 B2* | 5/2006 | Zerphy | ................ | G06F 3/1446 345/1.1 |
| 7,193,583 B2* | 3/2007 | Zerphy | ................ | G06F 3/1431 345/1.1 |

(Continued)

FOREIGN PATENT DOCUMENTS

| | | |
|---|---|---|
| JP | 2-61759 B2 | 12/1990 |
| JP | 3-201080 A | 9/1991 |

(Continued)

*Primary Examiner* — Patrick F Marinelli
(74) *Attorney, Agent, or Firm* — Birch, Stewart, Kolasch & Birch, LLP (57) ABSTRACT

In accordance with the present invention, in a display device having a plurality of displays arranged therein and causing a whole of said plurality of displays to display a single display screen, a plurality of typical small-size displays can be cascaded even on a portion where their shapes and the number of displays are arbitrary, and the whole of the displays can be caused to produce a single screen display while synchronization is achieved among the display timings.

5 Claims, 4 Drawing Sheets

(56) References Cited

U.S. PATENT DOCUMENTS

| | | | | |
|---|---|---|---|---|
| 7,369,099 B2* | 5/2008 | Arai | G06F 3/04815 | 345/1.1 |
| 7,986,282 B2* | 7/2011 | Zerphy | G06F 3/1431 | 345/1.3 |
| 9,047,041 B2* | 6/2015 | Locker | G06F 3/1446 | |
| 9,052,760 B2* | 6/2015 | Locker | G06F 3/041 | |
| 9,240,163 B2* | 1/2016 | Kuo | G09G 5/12 | |
| 9,304,733 B2* | 4/2016 | Koltuk | G06F 3/1446 | |
| 9,327,742 B2* | 5/2016 | Ookita | B61L 15/009 | |
| 9,392,239 B2* | 7/2016 | Asamura | H04N 9/3179 | |
| 9,489,166 B2* | 11/2016 | Chang-Chian | G06F 3/1431 | |
| 2005/0024292 A1* | 2/2005 | Cato | G06F 3/147 | 345/1.1 |
| 2005/0146485 A1* | 7/2005 | Zerphy | G06F 3/1431 | 345/1.1 |
| 2005/0146530 A1* | 7/2005 | Zerphy | G06F 3/1446 | 345/558 |
| 2005/0169212 A1 | 8/2005 | Doi et al. | | |
| 2006/0001593 A1* | 1/2006 | Baudisch | G06F 3/1446 | 345/1.1 |
| 2007/0241988 A1* | 10/2007 | Zerphy | G06F 3/1431 | 345/1.1 |
| 2009/0094658 A1* | 4/2009 | Kobayashi | H04N 5/775 | 725/118 |
| 2009/0243962 A1* | 10/2009 | Hioki | G06F 3/1431 | 345/1.3 |
| 2010/0271286 A1* | 10/2010 | Li | G06F 3/1446 | 345/1.3 |
| 2011/0316816 A1* | 12/2011 | Okuma | G09G 3/3688 | 345/204 |
| 2012/0056902 A1* | 3/2012 | Yoshino | G09G 3/20 | 345/660 |
| 2012/0062442 A1* | 3/2012 | Locker | G06F 3/1446 | 345/1.3 |
| 2012/0062475 A1* | 3/2012 | Locker | G06F 3/041 | 345/173 |
| 2012/0249415 A1* | 10/2012 | Nakajima | G06F 1/1647 | 345/156 |
| 2012/0254788 A1* | 10/2012 | Nicholson | G06F 3/0481 | 715/778 |
| 2013/0044089 A1* | 2/2013 | Chang-Chian | G06F 3/1431 | 345/204 |
| 2013/0193274 A1* | 8/2013 | Ookita | B61L 15/009 | 246/1 C |
| 2013/0328745 A1* | 12/2013 | Koltuk | G06F 3/1446 | 345/1.3 |
| 2014/0009422 A1* | 1/2014 | Arigaya | G09G 5/006 | 345/173 |
| 2014/0306966 A1* | 10/2014 | Kuo | G09G 5/12 | 345/502 |
| 2015/0205565 A1* | 7/2015 | Koguchi | G06F 3/1446 | 345/1.3 |
| 2015/0287390 A1* | 10/2015 | Kakeko | H04L 61/2038 | 345/1.1 |
| 2015/0381954 A1* | 12/2015 | Asamura | H04N 9/3147 | 348/383 |
| 2016/0062725 A1* | 3/2016 | Odagiri | G06F 3/1446 | 345/1.3 |
| 2016/0104455 A1* | 4/2016 | Chiu | G09G 5/12 | 345/1.3 |
| 2016/0124699 A1* | 5/2016 | Fukuhara | G06F 3/1423 | 345/1.3 |
| 2016/0300549 A1* | 10/2016 | Zhang | G09G 5/006 | |
| 2016/0343349 A1* | 11/2016 | Machida | G09G 3/32 | |
| 2017/0024179 A1* | 1/2017 | Terao | G06F 3/1446 | |

FOREIGN PATENT DOCUMENTS

| | | |
|---|---|---|
| JP | 2000-20042 A | 1/2000 |
| JP | 2000-20043 A | 1/2000 |
| JP | 2000-221934 A | 8/2000 |
| JP | 2000-276099 A | 10/2000 |
| JP | 2002-207247 A | 7/2002 |
| JP | 2005-175666 A | 6/2005 |
| JP | 2008-28782 A | 2/2008 |

* cited by examiner

DISPLAY DEVICE WITH PLURAL DISPLAYS

FIELD OF THE INVENTION

The present invention relates to a display device that has a plurality of displays arranged therein and that causes the whole of the displays to display a single display screen.

BACKGROUND OF THE INVENTION

Conventionally, a display device that is aimed at displaying an image on a large screen (large sized screen) in a meeting, a presentation, and so on, and that has a plurality of displays arranged therein in a matrix form and that causes the whole of the displays to display a single display screen is known (for example, refer to patent references 1 and 2).

RELATED ART DOCUMENT

Patent Reference

Patent reference 1: Japanese Examined Patent Application Publication No. Hei 2-61759
Patent reference 2: Japanese Unexamined Patent Application Publication No. Hei 3-201080

SUMMARY OF THE INVENTION

Problems to be Solved by the Invention

However, because the conventional display devices described in, for example, patent references 1 and 2 are configured in such a way that a predetermined number of displays having a predetermined size are arranged, and images to be displayed on the displays are transmitted to the displays via dedicated lines, respectively, and display commands are also transmitted to the displays, respectively, it is difficult to apply the conventional technique to a specific portion, such as a pillar portion in a vehicle, where the shapes and the number of displays differ according to vehicle types.

A further problem is that although when applying the conventional technique to a specific portion where the shapes and the number of displays are arbitrary, images need to be transmitted by radio and display commands also need to be transmitted by radio because it is difficult to transmit images via dedicated lines, in this case, it is difficult to achieve synchronization among the display timings of images displayed on the displays.

The present invention is made in order to solve the above-mentioned problems, and it is therefore an object of the present invention to provide a display device that has a plurality of displays arranged even on a portion where their shapes and the number of displays are arbitrary, and that causes the whole of the displays to serve as a single display screen, and that can cause the displays to display an image while achieving synchronization among the display timings.

Means for Solving the Problem

In order to achieve the above-mentioned object, in accordance with the present invention, there is provided a display device having a plurality of displays arranged therein and causing a whole of the above-mentioned plurality of displays to display a single display screen, the display device including: transmission source equipment to communicate with a first one of the above-mentioned plurality of displays, in which the above-mentioned plurality of displays are cascaded, starting with the above-mentioned first display, in such a way that displays adjacent to each other are connected, via communications, to each other, the above-mentioned first display increments a value corresponding to a counter received from the above-mentioned transmission source equipment and transmits the value to the next display adjacent thereto, each of displays adjacent to each other, located behind the above-mentioned first display, sequentially increments the value corresponding to the above-mentioned received counter and transmits the value to the next display adjacent thereto, and the value which has been incremented by one of the displays at an end is reversely transmitted up to the above-mentioned first display via the above-mentioned communications between adjacent displays, and in which the above-mentioned transmission source equipment detects the total number of the above-mentioned plurality of displays on the basis of the value corresponding to the above-mentioned counter which is received from the above-mentioned first display and which has been incremented by the above-mentioned display at the end, and also transmits screen data configured with data respectively corresponding to screen portions to be displayed in order on the displays adjacent to each other, starting with the above-mentioned first display, as screen data to be displayed on the whole of the above-mentioned plurality of displays, to the above-mentioned first display, and, when the displays adjacent to each other, starting with the above-mentioned first display, sequentially transmit the above-mentioned screen data received from the above-mentioned transmission source equipment, each of the above-mentioned plurality of displays determines the how-manieth display in the cascade the display itself is from the value corresponding to the above-mentioned counter which has been incremented thereby, and extracts data corresponding to a screen portion to be displayed thereon from the above-mentioned screen data according to the determined how-manieth display in the cascade and displays the data, and, when there is a change in the total number of the above-mentioned plurality of displays which is detected on the basis of the value corresponding to the above-mentioned counter which has been incremented by the above-mentioned display at the end, the above-mentioned transmission source equipment determines that a communication connection of either one of the above-mentioned plurality of displays has been disconnected.

Advantages of the Invention

In accordance with the present invention, a plurality of typical small-size displays can be cascaded even on a portion where their shapes and the number of displays are arbitrary, and the whole of the displays can be caused to produce a single screen display while synchronization is achieved among the display timings.

EMBODIMENTS OF THE INVENTION

Hereafter, the preferred embodiment of the present invention will be explained in detail with reference to the drawings.

Embodiment 1

Figure 1:
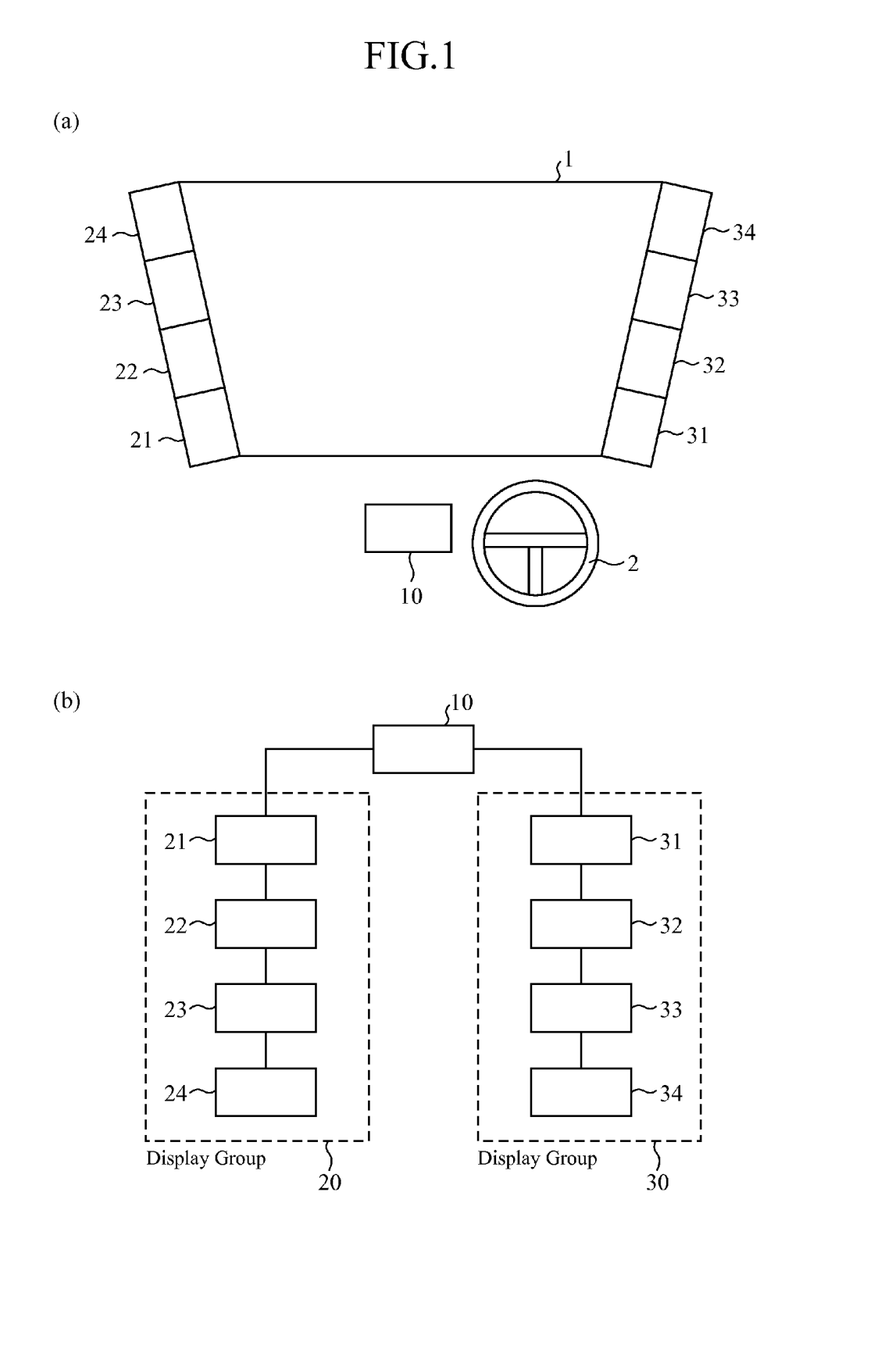
FIG. 1 is a schematic structural diagram showing an example of application of a display device in accordance with Embodiment 1.

FIG. 1 is a schematic structural diagram showing an example of application of a display device in accordance with Embodiment 1 of the present invention, i.e., a display device that has a plurality of displays arranged therein and that causes the whole of the plurality of displays to display a single display screen.

This display device is configured in such a way that, for example, four displays 21 to 24 connected to each other and four displays 31 to 34 connected to each other are disposed in right and left pillar portions on the both sides of the windshield 1 of a vehicle, respectively, as shown in FIG. 1(a), in order to prevent a user (driver) who is operating a steering wheel 2 from entering a state in which the user cannot visually recognize an external state (a scene, surrounding vehicles, persons, etc.).

This display device is also provided with a distributor (transmission source equipment) 10, and the distributor 10 and the display 21 are connected to each other via wireless communications in such a way as to be able to communicate with each other and the distributor 10 and the display 31 are connected to each other via wireless communications in such a way as to be able to communicate with each other. In addition, adjacent displays are connected via wireless communications in such a way as to be able to communicate with each other. Each of these connections can be established via, instead of wireless communications, cable communications, and wireless communications provide a merit of decreasing the space required for the connection, and being able to determine the shape of each of the displays and so on more freely.

FIG. 1(b) shows a connecting relation between the distributor (transmission source equipment) 10, and each of the displays 21 to 24 and 31 to 34. In this example, the distributor 10 is connected to a display group 20 configured with the displays 21 to 24, and a display group 30 configured with the displays 31 to 34.

In further detail, the distributor (transmission source equipment) 10 is connected, via communications, to the first displays 21 and 31 of the display groups 20 and 30. In the display group 20, the displays 21 and 22, the displays 22 and 23, and the displays 23 and 24 are cascaded in order via communications. Further, in the display group 30, the displays 31 and 32, the displays 32 and 33, and the displays 33 and 34 are cascaded in order via communications.

More specifically, the distributor (transmission source equipment) 10 communicates with the first displays 21 and 31, and, in the displays 21 to 24 and in the displays 31 to 34, displays adjacent to each other, starting with each of the first displays 21 and 31, are connected, via communications, to each other.

In the following explanation, the displays 21 and 31 connected to the distributor (transmission source equipment) 10 are referred to as first displays located the most upstream, and the displays 22 to 24 and 32 to 34 are referred to as displays located downstream. More specifically, for example, the display 23 is a one located more downstream than the display 22 and more upstream than the display 24.

The distributor (transmission source equipment) 10 detects the number of cascaded displays, and processes a display image in such a way that the display image can be filtered by each of the displays, to transmit data.

Each of the displays 21 to 24 and 31 to 34 filters only a display portion thereof from screen data received from the distributor 10 to extract and display the display portion thereof. Each of the displays also transmits the received screen data to the next display connected thereto, just as they are.

Figure 2:
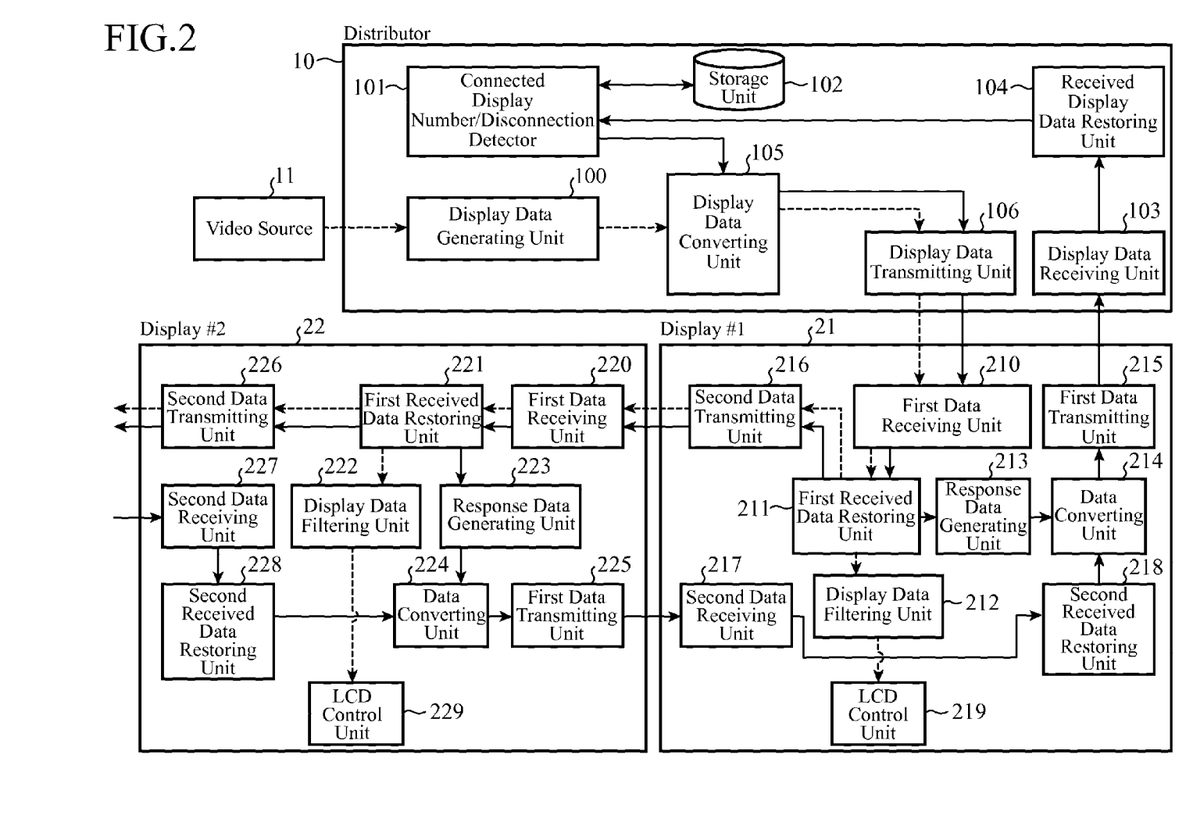
FIG. 2 is a block diagram showing the configuration of a distributor (transmission source equipment) and displays.

FIG. 2 is a block diagram showing the configuration of the distributor (transmission source equipment) 10 and the displays 21 and 22.

The distributor 10 includes a display data generating unit 100, a connected display number/disconnection detector 101, a storage unit 102, a display data receiving unit 103, a received display data restoring unit 104, a display data converting unit 105, and a display data transmitting unit 106.

The display data generating unit 100 receives an image (e.g., a video captured by a camera or the like) from a video source 11, and generates screen data to be displayed on the plurality of displays 21 to 24 and 31 to 34 which are connected to the distributor (transmission source equipment) 10. Hereafter, only the display group 20 (displays 21 to 24) on the left side of FIG. 1 will be explained.

In FIG. 2, a dashed arrow between blocks means an exchange of screen data (video data), and a solid arrow means an exchange of control data.

The connected display number/disconnection detector 101 detects the number of cascaded displays on the basis of either a response value corresponding to a counter set to a control command which is transmitted to the displays, or common information included in received data from the first display. Further, by using either periodic transmission of the control command or the common information, when it is determined on the basis of the count value incremented by the displays that there is a change in the detected number of cascaded displays (the total number of the plurality of displays), it is determined that the communication connection in either one of the plurality of displays has been disconnected or the number of cascaded displays has increased.

These pieces of detected information (the number of cascaded displays and disconnection information) are stored in the storage unit 102. More specifically, the connected display number/disconnection detector 101 detects a change in the number of cascaded displays on the basis of the previous number of cascaded displays stored in the storage unit 102, and, when the number of cascaded displays has decreased from the previous value, determines that a disconnection has occurred, whereas when the number of cascaded displays has increased from the previous value, the connected display number/disconnection detector determines that the number of cascaded displays has increased. At that time, the connected display number/disconnection detector does not necessarily determine that a disconnection has occurred or the number of cascaded displays has increased immediately after the number of cascaded displays has changed from the previous value, and, by taking into consideration a case in which wireless communications are performed and a mechanism of, even if a disconnection actually occurs, restoring the connection is adopted, and a case in which an instantaneous disconnection occurs and the connection is restored immediately, the connected display number/disconnection detector determines that a disconnection has occurred or the number of cascaded displays has increased if such a change has been detected a certain number of times (e.g., five times or more within a time period of 1 milliseconds).

More specifically, in accordance with the present invention, a display can be newly added while the display data are displayed, and, even if a disconnection temporarily occurs in a display, the connection can be restored by using self restoration in the display (display independent reset or the like).

The display data receiving unit 103 receives display response data after transmission of a control command which will be described below. The display data receiving unit also receives a response to each of data including transmitted display data and control commands from the display 21 (first data transmission unit 215), the response simply showing that the data has been received normally irrespective of the descriptions of the received data.

The received display data restoring unit 104 restores the display response data received by the display data receiving unit 103.

The display data converting unit 105 converts the display data (screen data), a control command, common information, or the like into that in a format for display on the basis of the number of cascaded displays which is detected by the connected display number/disconnection detector. If the number of cascaded displays changes during display, the display data is converted into display data corresponding to the changed number.

The display data transmitting unit 106 transmits the data after conversion which is acquired through the conversion by the display data converting unit 105 to the display.

At that time, when the display data receiving unit 103 does not receive any display response data from the display 21 within a fixed period of time even after the distributor transmits data to the display 21 from the display data transmitting unit 106, the distributor transmits the data again from the display data transmitting unit 106 and the display data receiving unit 103 waits for a response. Then, if the distributor does not receive any response even if the distributor retransmits the data several times, the distributor determines that the communication connection has been disconnected.

Further, referring to FIG. 2, the first display 21 connected, via communications, to the distributor (transmission source equipment) 10 includes a first data receiving unit 210, a first received data restoring unit 211, a display data filtering unit 212, a response data generating unit 213, a data converting unit 214, a first data transmitting unit 215, a second data transmitting unit 216, a second data receiving unit 217, a second received data restoring unit 218, and an LCD control unit 219.

At that time, first data is one to be exchanged with the distributor (transmission source equipment) 10, and second data is one to be exchanged with the display 22 connected downstream.

The first data receiving unit 210 receives the data after conversion from the distributor 10.

The first received data restoring unit 211 restores the data from the distributor 10 which is received by the first data receiving unit 210. The first received data restoring unit determines the display data (screen data) or a control command from the restored data, and sends the display data (screen data) to the display data filtering unit 212 or sends the control command to the response data generating unit 213. Further, if the received data presents no problem particularly at the time when it is restored, the first received data restoring unit sends the received data to the second data transmitting unit 216 in order to transmit the received data to the display located downstream.

The display data filtering unit 212 filters (extracts) the data corresponding to the display portion of the display itself, i.e., the screen portion to be displayed on the display itself from the display data (screen data), and sends the data to the LCD control unit 219.

The response data generating unit 213 generates response data corresponding to the control command, and sends the response data to the data converting unit 214.

The data converting unit 214 adds the response data (response value corresponding to the control command) received thereby to received data from the display 22 located downstream which the second received data restoring unit 218 has restored, and sends the received data to the first data transmitting unit 215 after performing format conversion. Further, when the first received data restoring unit 211 has succeeded in restoring the data received thereby without problems, the data converting unit also transmits information showing that the reception is completed without errors to the first data transmitting unit 215. This transmission is performed in order to prevent the distributor 10 located upstream from erroneously determining that a disconnection has occurred from the occurrence of a receive timeout because the distributor has waited for response data from the display located downstream even though the display located downstream has been actually performing the processing, depending on the timing when the upstream side determines that a receive timeout has occurred, i.e., even though the display located downstream can communicate with the distributor located upstream.

The first data transmitting unit 215 transmits the data after conversion to the distributor 10.

The second data transmitting unit 216 transmits the data from the distributor 10 to the adjacent display 22 located downstream.

The second data receiving unit 217 receives response data from the adjacent display 22 located downstream. The second data receiving unit also receives a response to data transmitted to the adjacent display located downstream from the display 22 (first data transmitting unit 225), the response simply showing that the data has been received normally irrespective of the descriptions of the received data.

At that time, when the second data receiving unit 217 does not receive any response data from the display 22 located downstream within a fixed period of time even if the first display transmits data to the display 22 located downstream thereof from the second data transmitting unit 216, the first display transmits the data again from the second data transmitting unit 216 and the second data receiving unit 217 waits for a response. If the first display does not receive any response even if it retransmits the data several times, the first display determines that there is no display located downstream thereof and then determines that the display itself is a display at an end when the data is a number-of-connected-displays control command before display of the display data. Further, the first display determines that the communication connection with the display located downstream has been disconnected when the data is the above-mentioned control command included in the display data.

The second received data restoring unit 218 restores response data from the adjacent display 22 located downstream.

The LCD control unit 219 sends the display data which is filtered by the display data filtering unit 212 to an LCD module, and performs display control on an LCD.

Further, referring to FIG. 2, the display 22 connected to the display 21 includes a first data receiving unit 220, a first received data restoring unit 221, a display data filtering unit 222, a response data generating unit 223, a data converting unit 224, a first data transmitting unit 225, a second data transmitting unit 226, a second data receiving unit 227, a second received data restoring unit 228, and an LCD control unit 229, like the display 21.

At that time, first data is one to be exchanged with the display 21 connected upstream, and second data is data to be exchanged with the display 23 connected downstream (not shown in FIG. 2).

The first data receiving unit 220 receives the data after conversion from the display 21 located upstream.

The first received data restoring unit 221 restores the data from the display 21 which is received by the first data receiving unit 220. The first received data restoring unit determines the display data (screen data) or a control command from the restored data, and sends the display data (screen data) to the display data filtering unit 222 or sends the control command to the response data generating unit 223. Further, if the received data presents no problem particularly at the time when it is restored, the first received data restoring unit sends the received data to the second data transmitting unit 226 in order to transmit the received data to the display located downstream.

The display data filtering unit 222 filters (extracts) the data corresponding to the display portion of the display itself, i.e., the screen portion to be displayed on the display itself from the display data (screen data), and sends the data to the LCD control unit 229.

The response data generating unit 223 generates response data corresponding to the control command, and sends the response data to the data converting unit 224.

The data converting unit 224 adds the response data (response value corresponding to the control command) received thereby to received data from the display 23 located downstream which the second received data restoring unit 228 has restored, and sends the received data to the first data transmitting unit 225 after performing format conversion. Further, when the first received data restoring unit 221 has succeeded in restoring the data received thereby without problems, the data converting unit also transmits information showing that the reception is completed without errors to the first data transmitting unit 225. This transmission is performed in order to prevent the display located upstream from erroneously determining that a disconnection has occurred downstream from the occurrence of a receive timeout, i.e., the display itself is a one at an end because the display has waited for response data from the display located downstream even though the display located downstream has been actually performing the processing, depending on the timing, i.e., even though the display located downstream can communicate with the display located upstream.

The first data transmitting unit 225 transmits the data after conversion to the display 21 located upstream.

The second data transmitting unit 226 transmits the data from the display 21 located upstream to the adjacent display 23 located downstream.

The second data receiving unit 227 receives response data from the adjacent display 23 located downstream. The second data receiving unit also receives a response to data transmitted to the adjacent display located downstream from the display 23, the response simply showing that the data has been received normally irrespective of the descriptions of the received data.

At that time, when the second data receiving unit 227 does not receive any response data from the display located downstream within a fixed period of time even if the second display transmits the data to the display located downstream thereof from the second data transmitting unit 226, the second display transmits the data again from the second data transmitting unit 226, and the second data receiving unit 227 waits for a response. If the second display does not receive any response even if it retransmits the data several times, the second display determines that there is no display located downstream thereof and then determines that the display itself is a display at an end when the data is a number-of-connected-displays control command before display of the display data. Further, the second display determines that the communication connection with the display located downstream has been disconnected when the data is the above-mentioned control command included in the display data.

The second received data restoring unit 228 restores response data from the adjacent display 23 located downstream.

The LCD control unit 229 sends the display data which is filtered by the display data filtering unit 222 to an LCD module, and performs display control on an LCD.

Figure 3:
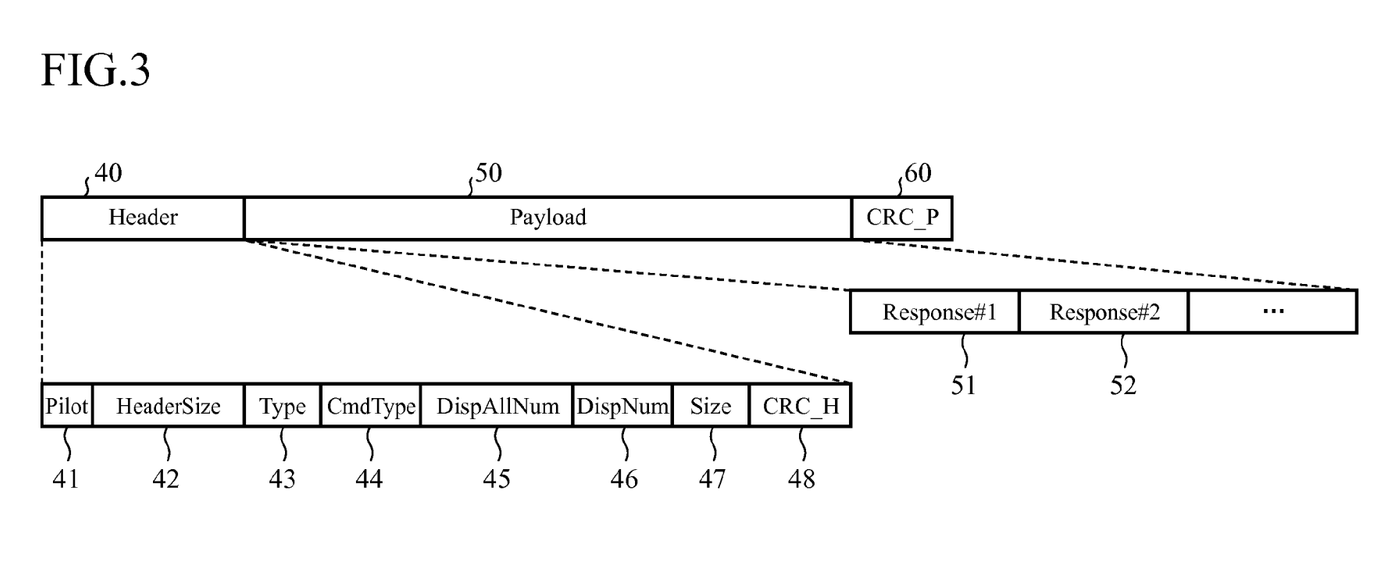
FIG. 3 is a diagram showing an example of the container format of data transmitted between the distributor (transmission source equipment) and the displays in Embodiment 1.

FIG. 3 is a diagram showing an example of the container format of data which is transmitted between the distributor (transmission source equipment) and the displays in Embodiment 1 of the present invention. The format is mainly configured with a header section 40 showing various pieces of information, and a payload section 50 which is the substance of transmission data. FIG. 3 shows an example of data about a control command, and payload section CRC data 60 is also included in the data.

The header section 40 includes a pilot (Pilot) for frame head synchronization 41, a data size (HeaderSize) 42 of the entire header (data type and subsequent items), a data type (Type) 43, a control command type (CmdType) 44, a connected display total number (DispAllNum) 45, a passage display counter (DispNum) 46, a payload section data size (Size) 47, and header section CRC data (CRC_H) 48

Further, the payload section 50 includes response data (Responses #1, #2, and . . . ) 51, 52, and . . . about responses to the control command from the distributor 10 from the displays.

In the detection of the number of cascaded displays, the distributor (transmission source equipment) 10 sets a control command for detection of the number of cascaded displays to CmdType44 of the header section 40 as control command data, and transmits the data first. Each of the displays which has received the control command transmits response data by using Response #n in the payload section 50.

As an example, the distributor sets "0" to a Response section (value corresponding to the counter) and then sets the Response section to the control command at the time of transmission, and each of the displays increments the Response portion (value corresponding to the counter). As a result, the display 21 increments the Response section by +1, so that the Response section becomes "1", the display 22 further increments the Response section by +1, so that the Response section becomes "2", the display 23 further increments the Response section by +1, so that the Response section becomes "3", and the display 24 further increments the Response section by +1, so that the Response section becomes "4."

More specifically, the first display 21 increments the value "0" corresponding to the counter which is received from the distributor (transmission source equipment) 10 and then transmits the value incremented thereby to the next display 22 adjacent thereto, and each of the adjacent displays (22, 23) located behind the first display 21 increments the value corresponding to the counter which is received thereby and then transmits the value incremented thereby to the next display (23, 24) adjacent thereto.

Because the display 24 is located at an end and no other display is connected any more, and hence does not receive any response even if transmitting data to a display located downstream, the display 24 determines that the display itself is located at an end. Then, the value of "4" which is the result of the incrementation by the display 24 located at an end (value corresponding to the counter) is reversely transmitted up to the first display 21 via communications between adjacent displays, and then returns to the distributor 10 as response data, so that the distributor knows that the number of plural cascaded displays (the total number of displays) is 4.

More specifically, the distributor 10 which is data transmission source equipment can detect the total number of plural cascaded displays on the basis of the value which is received from the first display 21, which has been incremented by the display 24 located at an end, and which corresponds to the counter set to the control command transmitted first from the distributor 10. Further, each of the displays provides the value corresponding to that counter by incrementing the numerical value of the specified region (Response section) in the control command.

In this embodiment, the example in which the distributor which is data transmission source equipment sets a value corresponding to the counter to a control command to be transmitted to the first display and then transmits the control command, and determines the total number of cascaded displays by causing each of the displays to increment the Response section (response data) in the payload section 50 incorporated into the control command is explained. Instead of this method, there can be provided a method of setting DispNum 46 of the header section 40 to be common information common between the distributor and the displays, and determining the number of cascaded displays by causing each of the displays to perform the same incrementation in an initial connection sequence at startup.

In that case, the distributor 10 which is data transmission source equipment transmits a value corresponding to the counter as common information common between the distributor and the first display 21, and each of the displays operates the common information common between the distributor and the display, so that the total number of plural cascaded displays can be detected. This determination can be performed by incrementing the numerical value of the specified region (DispNum) in the common information.

The displays 21 to 24 (the plurality of displays) can determine their respective positions (the how-manieth displays in the cascade the displays themselves are showing the how-manieth displays they are) by storing the Response values "1" to "4" (values which have been incremented thereby and which correspond to the counter) after incrementing the Response values, respectively.

As to disconnection of communications for display connection, an identical control command is transmitted periodically, and, when a comparison with the previous response data shows that there is a change (when the value of the response data decreases), it can be determined that the communication connection of either one of the plurality of displays has been disconnected.

This determination of whether or not the communication connection of a display has been disconnected makes it possible to detect a failure in a display and a connection failure.

Further, when the value of the response data increases, it can be determined that a new display is added.

As a result, a display can be newly added while the display data are displayed, and, even if a disconnection temporarily occurs in a display, the connection can be restored by using self restoration in the display (display independent reset or the like).

At that time, when determining that the communication connection of either one of the plurality of displays has been disconnected, the distributor 10 which is transmission source equipment transmits a control command not to display data to the first display. Because that control command is also transmitted to the adjacent displays in order, the plurality of displays 21 to 24 can be commanded so as not to display data.

Further, for example, when an abnormality or a disconnection occurs in a communication connection halfway through the plurality of displays 21 to 24 or when a display failure occurs, each display located downstream of the point where the failure has occurred cannot receive data from any upstream unit. Therefore, if no data can be received from any upstream unit during a fixed period of time, the LCD control unit of each display stops the screen display operation.

As a result, even when a failure occurs in a display or a connection failure occurs, the user can be prevented from having a feeling that something is abnormal and each display can be prevented from becoming rather hard to see.

Further, because, as to common information, the header section 40 is transmitted in a form in which it is multiplexed into the display data (screen data) irrespective of the type of the data, the common information is updated as required by performing the same incrementation, and, when a comparison with the previous common information shows that there is a change (difference), it can be determined that the communication connection of either one of the plurality of displays has been disconnected.

Simultaneously, each of the displays can know the how-manieth display it is (the how-manieth display in the cascade the display itself is) at the time of incrementing the value corresponding to the counter, and can also detect the change.

Figure 4:
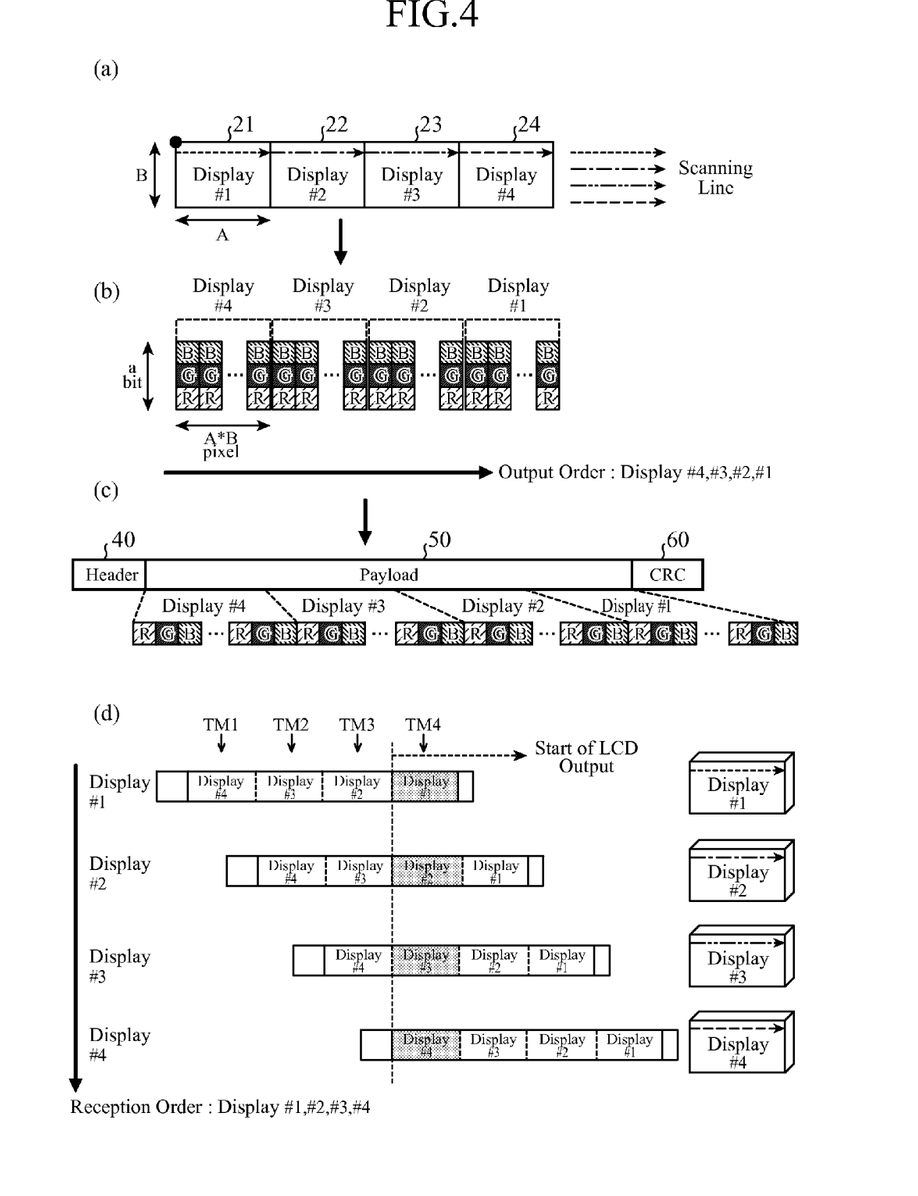
FIGS. 4(a), 4(b), 4(c) and 4(d) are explanatory drawings showing an example of a method of displaying an image in a case of displaying a single video on a display group as a whole.

FIG. 4 is an explanatory drawing showing an example of a method of displaying an image in a case of displaying a single video on the display group 20 as a whole. The display group 20 is configured with the displays 21 to 24 which are arranged as an array with one row and four columns, as shown in FIG. 1, and the displays 21 to 24 will be referred to as the displays #1 to #4, respectively.

FIG. 4(*a*) shows buffering of video data (screen data). First, the distributor (transmission source equipment) 10 buffers the video data (screen data) to be displayed on the plurality of displays #1 to #4. More specifically, the display data (screen data) to be displayed on the four displays cascaded is partitioned into parts whose number is equal to the number of displays, and the parts are buffered. The resolution of each of the displays can be acquired from common information.

Next, an interchange of the data for the displays #1 to #4 is carried out on the video data buffered in the distributor 10. More specifically, rearrangement is carried out on the order of the partitioned display data (screen data). While the video data are originally pixel data (RGB) provided for scanning lines in an X axial direction extending over the displays #1 to #4, each of the scanning lines is assumed to be scanning lines of the displays 21 to 24, and an interchange is carried out in such a way that the video data of each of the displays are pixel data having A pixels in the X axial direction and B pixels in a Y axial direction, i.e., A×B pixels in total.

Because in order to buffer the data about the A×B pixels in total, a memory capacity for that data is needed, only a single scanning line of pixel data in the X axial direction, i.e., only A pixels can be alternatively buffered and a similar data interchange can be carried out. By doing in this way, the memory capacity used for the buffering of the data can be reduced.

Further, an interchange is carried out on the plural sets of pixel data (A×B pixel data) whose order is to be rearranged in such a way that the pixel data for the display #4 located furthest downstream from the distributor 10 comes first.

FIG. 4(b) shows a state of the video data output in which rearrangement is carried out on the output order in this way.

Concretely, because the connecting relation (cascade order) is established in such a way that the distributor (transmission source equipment), the display #1, the display #2, the display #3, and the display #4 are cascaded in this order, an interchange is carried out on the screen data in such a way that the order that the screen data are outputted is the order of the display #4, the display #3, the display #2, and the display #1, as shown in FIG. 4(b).

The distributor (transmission source equipment) 10 then adds the header section 40 to the screen data, as shown in FIG. 4(c), and transmits the screen data to the display #1 (first display 21).

More specifically, the distributor 10 which is transmission source equipment transmits the screen data configured with the data respectively corresponding to the screen portions to be displayed in order on the first display 21 first and then on the adjacent displays 22, 23, and 24 to the first display 21, as the screen data to be displayed on the whole of the four displays. Further, at that time, the data corresponding to the screen portions to be respectively displayed on the displays are transmitted in the descending order from the data corresponding to the screen portion to be displayed on the display 24 at an end.

Because each of the plurality of displays can know the how-manieth screen display it produces (the how-manieth display in the cascade the display itself is) from the value corresponding to the counter which has been incremented thereby, as previously explained, each of the plurality of displays filters (extracts) only the data corresponding to the screen portion to be displayed thereon from the received screen data according to the determined how-manieth display in the cascade, and outputs the data to the LCD to display an image. Further, each of the displays outputs the received screen data to the adjacent display located downstream thereof, just as it is.

At that time, because the order in which the data are received by the displays is the order of the display #1, the display #2, the display #3, and the display #4, the time when each of the displays performs the filtering is nearly the same, and the displays can display images synchronously, as shown in FIG. 4(d).

It is assumed that the displays are connected to each other via high-speed wireless connections and data transmission between displays is carried out at a high speed.

More specifically, the display #1 receives the data outputted in the output order of the data for the displays #4, #3, #2, and #1 first. This data is transmitted to the adjacent display #2 located downstream, just as it is, and the display #2 similarly receives the data outputted in the output order of the data for the displays #4, #3, #2, and #1. Then, each of the displays #3 and #4 receives the data outputted in the same output order.

Because the display #1 recognizes that the display itself is located at the first position (the how-manieth display in the cascade), when receiving the data outputted in the output order of the data for the displays #4, #3, #2, and #1, the display #1 determines that the data for the display #4 which it has received for the first time is not the one which the display itself is to display (at a time of TM1), and then checks the next data for the display #3 (at a time of TM2).

When the display #1 then checks the data for the display #3 (at the time of TM2), the display #2 is just at the time when it checks the first data for the display #4. At that time, the display #1 determines that the data for the display #3 is not the one which the display itself is to display, and the display #2 also determines that the data for the display #4 is not the one which the display itself is to display (at the time of TM2).

In addition, the display #1 checks the next data for the display #2, the display #2 checks the next data for the display #3, and the display #3 checks the first data for the display #4 (at a time of TM3). Also at that time, each of the displays determines that the data is not the one which the display itself is to display, and shifts to the next check.

The display #1 then determines that the next data for the display #1 is the one which the display itself is to display (at a time of TM4), and outputs this data to the LCD to display an image.

More specifically, at the time when receiving the data corresponding to the screen portion to be displayed on the display 21 thereof, the display extracts the corresponding portion from the received screen data and displays an image.

Further, at the time of receiving the data corresponding to the screen portions to be displayed on the displays 22, 23, and 24 thereof, i.e., at the time of TM4, the displays #2, #3, and #4 similarly determine that they are the data which the displays themselves are to be display, and extract the corresponding portions and display images, respectively. Therefore, the displays can display a single screen as a whole in a state in which synchronization is achieved among the displays.

More specifically, the distributor which is data transmission source equipment processes the display data to be transmitted on the basis of either the response value used for the detection of the number of cascaded displays or common information in such a way that each of the displays can extract the display data at nearly the same time (synchronously). Further, the distributor rearranges the display data about a single screen, as a whole, to be displayed on the plurality of displays to generate display data corresponding to each of the displays.

More specifically, when rearranging the order of the partitioned display data, the distributor which is transmission source equipment rearranges the partitioned display data in order reverse to the order in which the plurality of displays are cascaded in such a way that each of the plurality of displays can extract and display the display data to be displayed thereon at the time which is synchronized with those of the other displays.

Further, each of the displays recognizes the position thereof (position of the display itself) on the basis of either the response value used for the detection of the number of cascaded displays or common information, and determines only the corresponding portion thereof, i.e., the display data portion to be displayed thereon from the display data received from the data transmission source equipment, and extracts and displays only the above-mentioned display data portion. As a result, each of the plurality of displays can display the image data (video data) thereon at the time which is synchronized with those of the other displays.

Because a plurality of typical small-size displays can be cascaded in this way to produce a single screen display which requires a specific shape, such as a pillar portion in a vehicle, the cost can be reduced and a flexible screen display can be produced.

Further, the transmission source equipment can detect the number of cascaded displays, a failure, and a disconnection of a display due to a wireless communication failure on the basis of either transmission and reception of a command between the distributor which is transmission source equipment and each display or common information. In addition, each of the displays can grasp the position thereof, and extract and display the portion corresponding to the display itself in the received data.

As mentioned above, in accordance with this Embodiment 1, a plurality of typical small-size displays can be cascaded even on a portion where their shapes and the number of displays are arbitrary, and the whole of the displays can be caused to produce a single screen display while synchronization is achieved among the display timings.

While the invention has been described in its preferred embodiment, it is to be understood that various changes can be made in an arbitrary component according to the embodiment, and an arbitrary component according to the embodiment can be omitted within the scope of the invention.

INDUSTRIAL APPLICABILITY

The display device in accordance with the present invention can be applied to a screen display which requires a specific shape, such as a pillar portion in a vehicle.

EXPLANATIONS OF REFERENCE NUMERALS

1 windshield, 2 steering wheel, 10 distributor (transmission source equipment), 11 video source, 20 and 30 display group, 21 to 24 and 31 to 34 display, 40 header section, 41 pilot (Pilot) for frame head synchronization, 42 data size (HeaderSize) of entire header (after data type), 43 data type (Type), 44 control command type (CmdType), 45 connected display total number (DispAllNum), 46 passage display counter (DispNum), 47 payload section data size (Size), 48 header section CRC data (CRC_H), 50 payload section, 51, 52, and . . . response data from each display to control command (Response#1, #2, and . . . ), 60 payload section CRC data, 100 display data generating unit, 101 connected display number/disconnection detector, 102 storage unit, 103 display data receiving unit, 104 received display data restoring unit, 105 display data converting unit, 106 display data transmitting unit, 210 and 220 first data receiving unit, 211 and 221 first received data restoring unit, 212 and 222 display data filtering unit, 213 and 223 response data generating unit, 214 and 224 data converting unit 215 and 225 first data transmission unit, 216 and 226 second data transmission unit, 217 and 227 second data receiving unit, 218 and 228 second received data restoring unit, and 219 and 229 LCD control unit.

The invention claimed is:

1. A display device having a plurality of displays arranged therein and causing a whole of said plurality of displays to display a single display screen, said display device comprising:
transmission source equipment to communicate with a first one of said plurality of displays,
wherein said plurality of displays are cascaded, starting with said first display, in such a way that displays adjacent to each other are connected, via communications, to each other, said first display increments a value corresponding to a counter received from said transmission source equipment and transmits the value to a next display adjacent thereto, each of displays adjacent to each other, located behind said first display, sequentially increments the value corresponding to said received counter and transmits the value to a next display adjacent thereto, and the value which has been incremented by one of said displays at an end is reversely transmitted up to said first display via said communications between adjacent displays, and
wherein said transmission source equipment detects a total number of said plurality of displays on a basis of the value corresponding to said counter which is received from said first display and which has been incremented by said display at the end, and also transmits screen data configured with data respectively corresponding to screen portions to be displayed in order on the displays adjacent to each other, starting with said first display, as screen data to be displayed on the whole of said plurality of displays, to said first display, and, when the displays adjacent to each other, starting with said first display, sequentially transmit said screen data received from said transmission source equipment, each of said plurality of displays determines how-manieth display in the cascade the display itself is from the value corresponding to said counter which has been incremented thereby, and extracts data corresponding to a screen portion to be displayed thereon from said screen data according to the determined how-manieth display in the cascade and displays said data, and, when there is a change in the total number of said plurality of displays which is detected on the basis of the value corresponding to said counter which has been incremented by said display at the end, said transmission source equipment determines that a communication connection of either one of said plurality of displays has been disconnected.

2. The display device according to claim 1, wherein said transmission source equipment transmits, as the screen data to be displayed on the whole of said plurality of displays, the data respectively corresponding to the screen portions to be displayed on the displays to said first display in descending order from the data corresponding to the screen portion to be displayed on said display at the end, and each of said plurality of displays extracts the data corresponding to the screen portion to be displayed thereon from said screen data at a time of receiving the corresponding data.

3. The display device according to claim 1, wherein after incrementing the value corresponding to said received counter and then transmitting the value to the next display adjacent thereto, each of said plurality of displays waits for a response from said next display, and, when not receiving any response from said next display during a fixed period of time, determines that the display itself is the one at the end.

4. The display device according to claim 1, wherein when determining that a communication connection of either one of said plurality of displays has been disconnected, said transmission source equipment transmits a control command not to display the display data to said first display.

5. The display device according to claim 1, wherein said transmission source equipment either sets the value corresponding to said counter to control command data or transmits the value corresponding to said counter as information common between said transmission source equipment and said first display.

\* \* \* \* \*